United States Patent Office 2,994,706
Patented Aug. 1, 1961

2,994,706
2,3 BIS(2-ALKYNYLOXY)-DIOXANES
Irving Rosen, Painesville, Ohio, assignor to Diamond Alkali Company, Cleveland, Ohio, a corporation of Delaware
No Drawing. Filed Nov. 1, 1957, Ser. No. 693,821
2 Claims. (Cl. 260—340.6)

This invention relates to compounds having the structure:

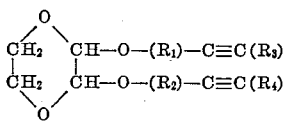

wherein $R_1$ and $R_2$ are alkylene groups, e.g., methylene, ethylene, propylene, butylene and the like, $R_3$ and $R_4$ are selected from the group consisting of alkyl radicals, such as methyl, ethyl, propyl, butyl and the like, and hydrogen atoms, and to their preparation and use.

Specific illustrative compounds of this invention are 2,3-bis(2-propynyloxy)-dioxane; 2,3-bis(2-butynyloxy)-dioxane; and 2,3-bis(2-pentynyloxy)-dioxane.

The above 2,3-alkyne dioxanes are prepared by chemically combining an acetylenic alcohol, such as $CH \equiv CCH_2OH$, $CH \equiv C(CH_2)_2OH$, $CH \equiv C(CH_2)_3OH$ and $CH \equiv C(CH_2)_4OH$, with a 2,3-dihalo dioxane-1,4, i.e., 2,3-dibromo dioxane-1,4, 2,3-dichloro dioxane-1,4 and 2,3-difluoro dioxane-1,4 in approximately stoichiometric amounts. This reaction is typically carried out by refluxing the reactants in the presence of a solvent, such as toluene, dioxane and benzene.

The compounds of this invention are useful in the fields of pharmaceuticals, chemical intermediates, and as stated above show biological activity, such as the control of micro-organism growth, e.g., inhibition of bacterial and spore germination.

While compounds of this invention may be employed in a variety of applications, biologically active or otherwise, when employed as biologically active materials, it will be understood, of course, that such compounds may be utilized in diverse formulations, both liquid and solid including finely-divided powders and granular material as well as liquids, such as solutions, concentrates, emulsifiable concentrates, slurries and the like, depending on the application intended and the formulation media desired.

Thus, it will be appreciated that compounds of this invention may be employed to form biologically active substances containing such compounds as essential active ingredients thereof, which compositions may also include finely-divided dry or liquid diluents, extenders, fillers, conditioners, including various clay, diatomaceous earth, talc, spent catalyst, alumina silica materials and incorporating liquid solvents, diluents, extenders, particularly water and various organic liquids such as kerosene, benzene, toluene, and other petroleum distillate fractions or mixtures thereof.

When liquid formulations are employed, or dry materials prepared which are to be used in liquid form, it is desirable in certain instances additionally to employ a wetting, emulsifying or dispersing agent to facilitate use of the formulation, e.g., Triton X-155 (alkyl aryl polyether alcohol, U.S. Patent 2,504,064).

The term "carrier" as employed in the specification and claims is intended to refer broadly to the material constituting a major proportion of a biologically active or other formulation and hence includes finely-divided materials, both liquids and solids, as aforementioned, conventionally used in such applications.

In order that those skilled in the art may more completely understand the present invention and the preferred methods by which the same may be carried into effect, the following specific examples are offered:

EXAMPLE I

Part A

Preparation of 2,3-bis(2-propynyloxy)-dioxane.—78.5 g. (0.5 mol) of 2,3-dichlorodioxane-1,4 is placed in a flask fitted with reflux condenser and hydrogen chloride trap. To this is added a solution of 59.0 g. (1.05 mols) of propargyl alcohol and 80 ml. of dry toluene. The solution is heated to boiling and refluxed for 10½ hours followed by washing with 70 ml. of a 3% sodium carbonate solution. The sodium carbonate is then washed out with water and the organic layer dried over magnesium sulfate. Unreacted starting materials and toluene are stripped from the solution at reduced pressure. The desired product is then purified by vacuum distillation to obtain a fraction boiling at 140°–144° C. at 9 mm. mercury pressure. Preparation of the desired $C_{10}H_{12}O_4$ by this procedure is indicated by the following elemental analytical data:

| Element | Actual percent by weight | Calculated percent by weight |
|---|---|---|
| C | 60.9 | 61.2 |
| H | 6.14 | 6.16 |

EXAMPLE I

Part B

Insecticidal utility is shown in using the bean aphid, *Aphis fabae*, cultured on nasturtium plants, no attempt being made to select insects of a given age. Nasturtium plants are infested with approximately 100 aphids at the time of treatment. The test plants are treated by pouring a formulation (concentration test chemical, 5% acetone, 0.01% Triton X-155, the balance water) on the soil in which the plants are growing at a rate equivalent to 64, 32, 16 and 8 lbs. per acre. Insect mortality figures of 90%, 78%, 60% and 48% are observed for the above concentrations, respectively.

EXAMPLE I

Part C

A tomato foliage disease test is conducted measuring the ability of the test compound to protect tomato foliage against infection by the early blight fungus, *Alternaria solani*. Tomato plants 5 to 7″ high of the variety Bonny Best are employed. The plants are sprayed with 100 ml. of test formulation at 2000 p.p.m. test chemical in combination with 5% acetone, 0.01% Triton X-155, and the balance water at 40 pounds air pressure while being rotated on a turntable in a spray chamber. After the spray deposit is dry, the treated plants, and comparable untreated control plants, are sprayed with a spore suspension containing approximately 20,000 conidia of *A. solani* per ml. The plants are held in a saturated atmosphere for 24 hours at 50° F. to permit spore germination and infection. After 2 to 4 days, lesion counts are made on the three uppermost fully expanded leaves, and a significant control of the fungus is observed.

EXAMPLE I

Part D

Further fungicidal utility is demonstrated by the ability of the test compound to protect tomato plants against the late blight fungus, *Phytophthora infestans*. The method employs tomato plants 5 to 7″ high of the variety Bonny Best. 100 ml. of the test formulation at 400 p.p.m. test chemical in combination with 5% acetone, 0.01% Triton X–155 and the balance water are sprayed on the plants at 40 pounds air pressure while the plants are being rotated on a turntable in the spray chamber. After the spray deposit is dry, the treated plants and comparable untreated controls are sprayed with a spore suspension containing approximately 150,000 sporangi of *P. infestans* per ml. The plants are held in a saturated atmosphere for 24 hours at 60° F. to permit spore germination and infection. After 2 to 4 days, lesion counts are made on the three uppermost fully expanded leaves. Comparing the number of lesions on the test plants with the control plants shows disease control of 74%.

EXAMPLE I

*Part E*

Bean, variety Tendergreen, and tomato, variety Bonny Best, plants growing in 4″ pots are treated by pouring a test formulation (concentration test chemical equivalent to 128 pounds per acre, 5% acetone, 0.01% Triton X–155, and the balance water) into the pot. The tomato plants are 3 to 4″ tall and the trifoliant leaves just starting to unfold at time of treatment. The bean plants are exposed to powdery mildew continuously after seedling emergence so that at the time of treatment, infection has occurred. After 10 to 14 days, observation indicates 60% control of the early blight infested tomato plants, and the bean plants are killed, thus indicating both fungicidal and herbicidal activity.

EXAMPLE I

*Part F*

Seeds of perennial rye grass and radish are treated in Petri dishes with aqueous solutions of a test chemical at 1000 and 100 p.p.m. (1000, 100 p.p.m. test chemical, 5% acetone, 0.01% Triton X–155, and the balance water). Lots of 25 seeds of each type are scattered in separate dishes containing filter paper discs moistened with 5 ml. of the test formulation at each concentration. After 7 to 10 days, observation indicates a concentration between 100 and 1000 p.p.m. inhibits germination of half the spores in the test crops.

EXAMPLE I

*Part G*

To evaluate the effect of the test chemical upon the germination of seeds in soil, a mixture of seed of six crop plants is broadcast in 8″ x 8″ x 2″ metal cake pans filled to within one-half inch of the top with composted greenhouse soil. The seed is uniformly covered with about one-quarter inch of the soil and watered. After 24 hours, 80 ml. of an aqueous test formulation containing 320 mg. test compound is sprayed at 10 pounds air pressure uniformly over the surface of the pan. This is equivalent to 64 pounds per acre. The seed mixture contains representatives of three broadleaf; turnip, flax, and alfalfa, and three grasses; wheat, millet, and rye grass. Two weeks after treatment records are taken on seedling stand as compared to controls. Using this procedure results show a 100% stand in both the broadleaf and grass crops.

EXAMPLE I

*Part H*

To evaluate bactericidal activity the test chemical is mixed with distilled water, containing 5% acetone and 0.01% Triton X–155, at a concentration of 1000 p.p.m. 2 ml. of the test formulation are put into each of 4 test tubes. To each test tube is added 0.5 ml. of culture broth of a different test organism. Following organisms are used: *Erwenia amylovora*, *Xanthamonas phaseoli*, *Staphylococcus aureus* and *Escherichia coli*. The first two organisms are plant pathogens. The tubes are then incubated for 24 hours at 37° C. Transfers are then made to sterile broth with a standard 4 mm. loop and incubated for 48 hours at 37° C. when growth is rated as follows. A=no growth, B=slight, C=moderate, and D=heavy growth. Using this procedure the product of Part A of this example receives ratings B, A, B, A for the above organisms, respectively.

EXAMPLE I

*Part I*

Further biological evaluation is carried out using adult two-spotted spider mites, *Tetranychus bimaculatus*, maintained on Tendergreen beans under controlled conditions. Young bean plants 3 to 4″ tall are treated by pouring a test formulation (test chemical, 5% acetone, 0.01% Triton X–155, and the balance water) on the soil at a rate equivalent to 64 and 32 pounds per acre. 24 hours later the four seed leaves in each pot are infested by leaf cuttings from Tendergreen bean plants infested with the said spider mite. Counts are recorded 3 days after the plants are infested showing better than 80% mortality at both concentrations.

It is to be understood that although the invention has been described with specific reference to particular embodiments thereof it is not to be so limited since changes and alterations therein may be made which are within the full intended scope of this invention as defined by the appended claims.

What is claimed is:

1. A compound of the structure:

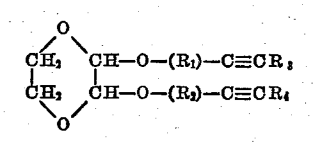

wherein $R_1$ and $R_2$ are lower alkylene groups, and $R_3$ and $R_4$ are selected from the group consisting of lower alkyl groups and hydrogen atoms.

2. 2,3-bis(2-propynyloxy)-dioxane.

References Cited in the file of this patent

UNITED STATES PATENTS

| | | |
|---|---|---|
| 2,195,386 | Britton et al. | Mar. 26, 1940 |
| 2,527,853 | Roach et al. | Oct. 31, 1950 |
| 2,790,812 | Werner et al. | Apr. 30, 1957 |
| 2,799,616 | Johnson | July 16, 1957 |
| 2,824,875 | Elpern | Feb. 25, 1958 |
| 2,843,601 | Lorette | July 15, 1958 |
| 2,843,602 | Lorette | July 15, 1958 |
| 2,861,919 | Gilbert | Nov. 25, 1958 |
| 2,875,124 | Gaertner et al. | Feb. 24, 1959 |